US008856584B2

(12) United States Patent
Matsubara

(10) Patent No.: US 8,856,584 B2
(45) Date of Patent: Oct. 7, 2014

(54) TRANSPORT CONTROL SERVER THAT MODIFIES ROUTING INFORMATION

(75) Inventor: Daisuke Matsubara, Yokohama (JP)

(73) Assignee: Hitachi, Ltd., Tokyo (JP)

(*) Notice: Subject to any disclaimer, the term of this patent is extended or adjusted under 35 U.S.C. 154(b) by 713 days.

(21) Appl. No.: 13/055,243

(22) PCT Filed: Jul. 31, 2009

(86) PCT No.: PCT/JP2009/063651
§ 371 (c)(1),
(2), (4) Date: Jan. 21, 2011

(87) PCT Pub. No.: WO2010/018755
PCT Pub. Date: Feb. 18, 2010

(65) Prior Publication Data
US 2011/0126041 A1    May 26, 2011

(30) Foreign Application Priority Data
Aug. 11, 2008  (JP) .................. 2008-206558

(51) Int. Cl.
*G06F 11/00*  (2006.01)
*H04L 12/707*  (2013.01)
*H04L 12/703*  (2013.01)
*H04L 12/717*  (2013.01)

(52) U.S. Cl.
CPC ............... *H04L 45/22* (2013.01); *H04L 45/28* (2013.01); *H04L 45/42* (2013.01)
USPC ........................... 714/4.2; 714/4.11; 370/217

(58) Field of Classification Search
CPC ......... H04L 45/22; H04L 45/28; H04L 45/02; H04L 45/42; H04L 12/437; H04L 41/0266; H04L 41/12; H04L 41/22; H04L 41/26; H04L 45/00; H04L 45/125; H04L 45/18; G06F 11/2005; G06F 17/5054
USPC .................. 714/4.11, 4.2, 47.2, 47.3; 370/217
See application file for complete search history.

(56) References Cited

U.S. PATENT DOCUMENTS 5,513,345 A * 4/1996 Sato et al. ............... 714/4.21
6,609,212 B1 * 8/2003 Smith ............................ 714/4.5
(Continued)

FOREIGN PATENT DOCUMENTS

JP    2000-69079 A    3/2000
JP    2002-271372 A    9/2002
(Continued)

*Primary Examiner* — Bryce Bonzo
*Assistant Examiner* — Elmira Mehrmanesh
(74) *Attorney, Agent, or Firm* — Mattingly & Malur, PC

(57) ABSTRACT

The time required for a path recalculation and a path switching upon occurrence of a failure is shortened. A path generation unit of a transport control server (TCS) S-1 generates the normal path information in accordance with the topology information of a network and the resource information which are set. Also, the path generation unit generates in advance the backup path information for occurrence of the failure based on the prediction topology information and the prediction resource information which have been modified in accordance with a predicted failure position. A path information notification unit of the TCS (S-1) notifies nodes N of the generated normal path information. A failure information acquisition unit of the TCS (S-1) detects the occurrence of the failure. If the occurrence of the failure is detected, the path information notification unit notifies the nodes N of the backup path information that is stored.

9 Claims, 11 Drawing Sheets

(56) References Cited

U.S. PATENT DOCUMENTS

| | | | |
|---|---|---|---|
| 7,272,755 B2* | 9/2007 | Smith | 714/47.3 |
| 7,352,703 B2* | 4/2008 | Elie-Dit-Cosaque et al. | 370/237 |
| 7,478,145 B2* | 1/2009 | Braun et al. | 709/220 |
| 7,719,960 B2* | 5/2010 | Atlas et al. | 370/222 |
| 7,852,751 B2* | 12/2010 | Bryant et al. | 370/218 |
| 2002/0131424 A1 | 9/2002 | Suemura | |
| 2004/0076164 A1* | 4/2004 | Vanderveen et al. | 370/400 |
| 2004/0225911 A1* | 11/2004 | Smith | 714/4 |
| 2007/0280100 A1 | 12/2007 | Doi et al. | |
| 2011/0038253 A1* | 2/2011 | Yabusaki et al. | 370/217 |

FOREIGN PATENT DOCUMENTS

| | | |
|---|---|---|
| JP | 2003-131905 A | 5/2003 |
| JP | 2003-244202 A | 8/2003 |
| JP | 2003-333124 A | 11/2003 |
| JP | 2006-246122 A | 9/2006 |
| JP | 2007-324981 A | 12/2007 |
| JP | 2008-66843 A | 3/2008 |

* cited by examiner

| FAILURE TYPE | RELEVANT NODE INFORMATION | BACKUP ROUTING INFORMATION ID |
|---|---|---|
| 001 ( FAILURE OF NODE N-3 ) | N-1 | 001 |
| | N-5 | 002 |
| 002 ( LINK COMMUNICATION BREAK BETWEEN NODES N-1/N-3 ) | N-1 | 003 |
| 003 ( LINK COMMUNICATION BREAK BETWEEN NODES N-2/N-5) | N-2 | 004 |
| | N-5 | 005 |

FIG. 6

BACKUP ROUTING INFORMATION ID: 001

| ENTRY | DESTINATION NODE (NORMAL ROUTE) | DESTINATION NODE (BACKUP ROUTE) |
|---|---|---|
| 145.23.33.0/24 | N-3 | N-2 |
| 145.23.34.0/24 | N-3 | N-4 |
| 145.23.35.0/24 | N-3 | N-2 |

FIG. 7

| FAILURE TYPE | FAILURE POSITION |
|---|---|
| 001 (FAILURE OF NODE N-3) | N-3 |
| 002 (LINK COMMUNICATION BREAK BETWEEN NODES N-1/N-3) | N-1, N-3 |
| 003 (LINK COMMUNICATION BREAK BETWEEN NODES N-2/N-5) | N-2, N-5 |
| ⋮ | ⋮ |

FIG. 8

| TO \ FROM | N-1 | N-2 | N-3 | N-4 | N-5 |
|---|---|---|---|---|---|
| N-1 |  | L12 | L13 | L14 |  |
| N-2 | L21 |  |  |  | L25 |
| N-3 | L31 |  |  |  | L35 |
| N-4 | L41 |  |  |  | L45 |
| N-5 |  | L52 | L53 | L54 |  |

FIG. 9

| RESOURCE TYPE / LINK IDENTIFIER | BAND INFORMATION | BUFFER CAPACITY | ... |
|---|---|---|---|
| L12 | LB21 | LC12 | ... |
| L13 | LB31 | | ... |
| L14 | --- | --- | ... |

FIG. 10

TRANSPORT CONTROL SERVER THAT MODIFIES ROUTING INFORMATION

FIELD OF THE INVENTION

The present invention relates to a transport control server (TCS: Transport Control Server), a network system and a transport control method, and more particularly to a transport control server, a network system and a transport control method in which a backup route (spare route) to be switched over upon occurrence of a failure is calculated in advance, apart from a normal route (regular route).

BACKGROUND OF THE INVENTION

In the conventional protocol such as an Open Shortest Path First (OSPF), each node (e.g., router) within a domain recalculates the routing information (route recalculation) and then switches over to the new route for transfer, upon occurrence of a failure.

FIG. 11 is an explanatory view of the conventional art.

For example, in the case of using the existent protocol such as the OSPF, a Designated Router (DR) that is a node for managing a Link State Database (LSDB) is provided. In an example of FIG. 11, the node N-1 is DR.

For example, when a failure occurs at the node N-3, the adjacent nodes like N-1 detect the failure. The node N-1 that detects the failure updates the LSDB (database for managing the link state). The node N-1 sends a Link-State Advertisement (LSA), and notifies the information of updated link state to each node. At all the nodes N-1, N-2, N-4 and N-5, the route recalculation is performed.

In patent document 1, there were disclosed a network connection apparatus and a network connection method in which as a countermeasure against failure at the single node, each node generates and holds the information regarding the route switching (interface change for inter-node link) when the failure occurs as a scenario, and makes recalculation for updating a routing table with an existent function such as the OSPF.

Also, in patent document 2, there were disclosed a network management apparatus that, after receiving a failure, changes the network configuration, and notifies it to each relevant network apparatus, and a network apparatus that, after receiving the new network configuration, recalculates the routing table.

Further, in patent document 3, there was disclosed a path control protocol processing method with a Global Megamedia Network-Connectionless (GMN-CL) is separated into a path control process and a transfer control process to manage a path control protocol of the same kind as the same user group.

CONVENTIONAL TECHNOLOGY DOCUMENTS

Patent Documents

Patent document 1: JP-A-2007-324981
Patent document 2: JP-A-2006-246122
Patent document 3: JP-A-2000-69079

DISCLOSURE OF INVENTION

Problems to be Solved

It may often take a long time to recalculate the route when a failure occurs. Also, in the conventional art, since the route recalculation is made even at the node not requiring the route switching, it is supposed that a wasteful processing load may be imposed. For example, in an example of FIG. 11, when a failure occurs at the node N-3, the route switching may be often unnecessary at the nodes N-2 and N-4.

In the light of the above-mentioned problems, it is an object of the invention to provide a transport control server that calculates in advance the backup route to shorten the time required for a route recalculation and a route switching upon occurrence of a failure.

Means to Solve the Problems

According to the first solving means of this invention, there is provided a transport control server for a network system comprising a plurality of nodes and the transport control server, each node transferring data in accordance with routing information notified from the transport control server, the transport control server comprising:

a route generation unit for generating normal routing information based on topology information of a network and resource information which are set and, generating in advance backup routing information in case of occurrence of a failure at a predicted failure position based on prediction topology information and prediction resource information which have been modified in accordance with the predicted failure position;

a routing information notification unit for notifying the nodes of the generated normal routing information;

a data storage unit for storing generated backup routing information; and a failure information acquisition unit for detecting the occurrence of the failure;

wherein if the failure information acquisition unit detects the occurrence of the failure, the routing information notification unit notifies the nodes of the backup routing information stored in the data storage unit.

According to the second solving means of this invention, there is provided a network system comprising:

a transport control server; and a plurality of nodes transferring data in accordance with routing information notified from the transport control server, wherein the transport control server comprises:

a route generation unit for generating normal routing information based on topology information of a network and resource information which are set and, generating in advance backup routing information in case of occurrence of a failure at a predicted failure position based on prediction topology information and prediction resource information which have been modified in accordance with the predicted failure position;

a routing information notification unit for notifying the nodes of the generated normal routing information;

a data storage unit for storing generated backup routing information; and a failure information acquisition unit for detecting the occurrence of the failure;

wherein if the failure information acquisition unit detects the occurrence of the failure, the routing information notification unit notifies the nodes of the backup routing information stored in the data storage unit, wherein the nodes receive the backup routing information from the transport control server and change the normal routing information into the backup routing information.

According to the third solving means of this invention, there is provided a transport control method in a network system comprising a plurality of nodes and the transport control server, each node transferring data in accordance with routing information notified from the transport control server, the transport control method including the steps of:

generating normal routing information based on topology information of a network and resource information which are set;

generating in advance backup routing information in case of occurrence of a failure at a predicted failure position based on prediction topology information and prediction resource information which have been modified in accordance with the predicted failure position;

notifying the nodes of the generated normal routing information;

storing generated backup routing information;

detecting the occurrence of the failure; and notifying the nodes of the backup routing information stored, if detecting the occurrence of the failure.

Advantage

According to the invention, it is possible to provide a transport control server that calculates in advance the backup route to shorten the time required for a route recalculation and a route switching upon occurrence of a failure.

BRIEF DESCRIPTION OF THE DRAWINGS

FIG. 6 is an explanatory view of a backup routing information ID table 24-1.

FIG. 7 is an explanatory view of a backup routing information table 24-2.

FIG. 8 is an explanatory view of a failure type discrimination information storage unit 26.

FIG. 9 is an explanatory view of topology information.

FIG. 10 is an explanatory view of a resource information storage unit 22.

EMBODIMENT OF THE INVENTION

Figure 1:
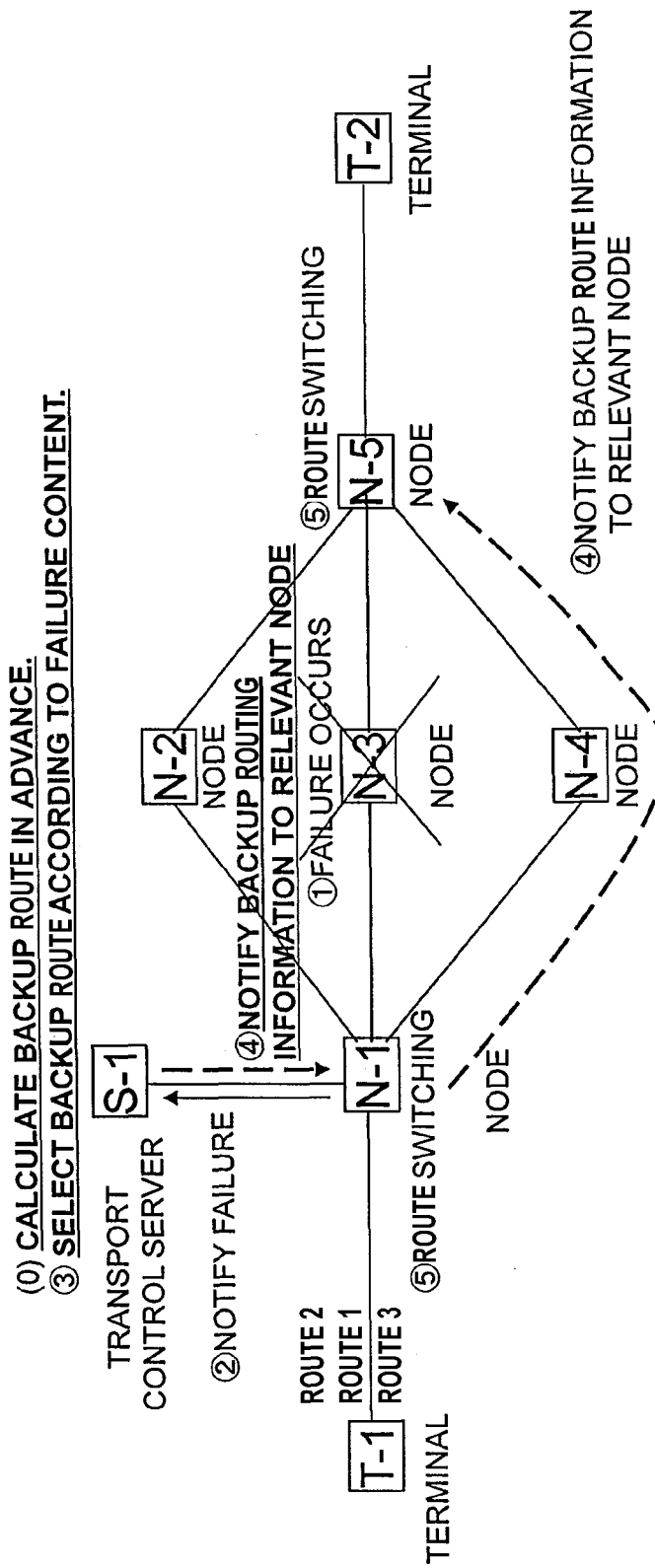
FIG. 1 is a configuration diagram of a transport control system.

FIG. 1 is a configuration diagram of a transport control system.

The transport control system includes a transport control server S-1 and a plurality of nodes N, for example. In an example of FIG. 1, the five nodes N-1 to N-5 are shown, but any number of nodes N may be provided. The terminals T-1 and T-2 communicate via the nodes N.

Each node N sets up the routing information notified from the transport control server S-1, and transfers data in accordance with the set routing information.

The transport control server S-1 calculates in advance a backup route to be switched over upon occurrence of a failure, aside from a normal route. Two or more backup routes may be calculated in accordance with the failure type. The failures as referred to herein include the failure of node N, failure of communication line (link) and congestion of node N.

For example, when a failure occurs at any of the nodes N, the transport control server S-1 detects the failure, and selects the backup routing information in accordance with the failure content. The transport control server S-1 sends the backup routing information ID or backup routing information to only the relevant node N to instruct the switching. The node N switches the routes in accordance with the received backup routing information ID or backup routing information.

An instance where a failure occurs at the node N-3 in FIG. 1 will be described below.

The transport control server S-1 calculates in advance the backup route and stores it. If a failure occurs at the node N-3, the adjacent nodes N-1 and N-5 detect the failure, and send a failure notification to the transport control server S-1. The methods for detecting and notifying the failure may use the appropriate conventional art. The transport control server S-1 selects the backup route corresponding to the failure. Also, the transport control server S-1 notifies the selected backup routing information to only the relevant nodes N-1 and N-5. The nodes N-1 and N-5 receiving the notification switches the routes based on the notified backup routing information.

The transport control server S-1 can also calculate in advance the backup route when the failures occur at two or more positions at the same time. Also, the calculation of the backup route can be made in advance for a specific failure, but not for all the patterns, for example. Thereby, the calculation amount and the data amount can be reduced. The transport control server S-1 may predict in advance a part where there is high possibility that the failure or congestion occurs, and preferentially calculate the backup route when the predicted failure or congestion occurs, for example. Further, for a failure occurring on the other layers, the transport control server S-1 may calculate in advance the backup route, and switch the routes, for example.

Figure 2:
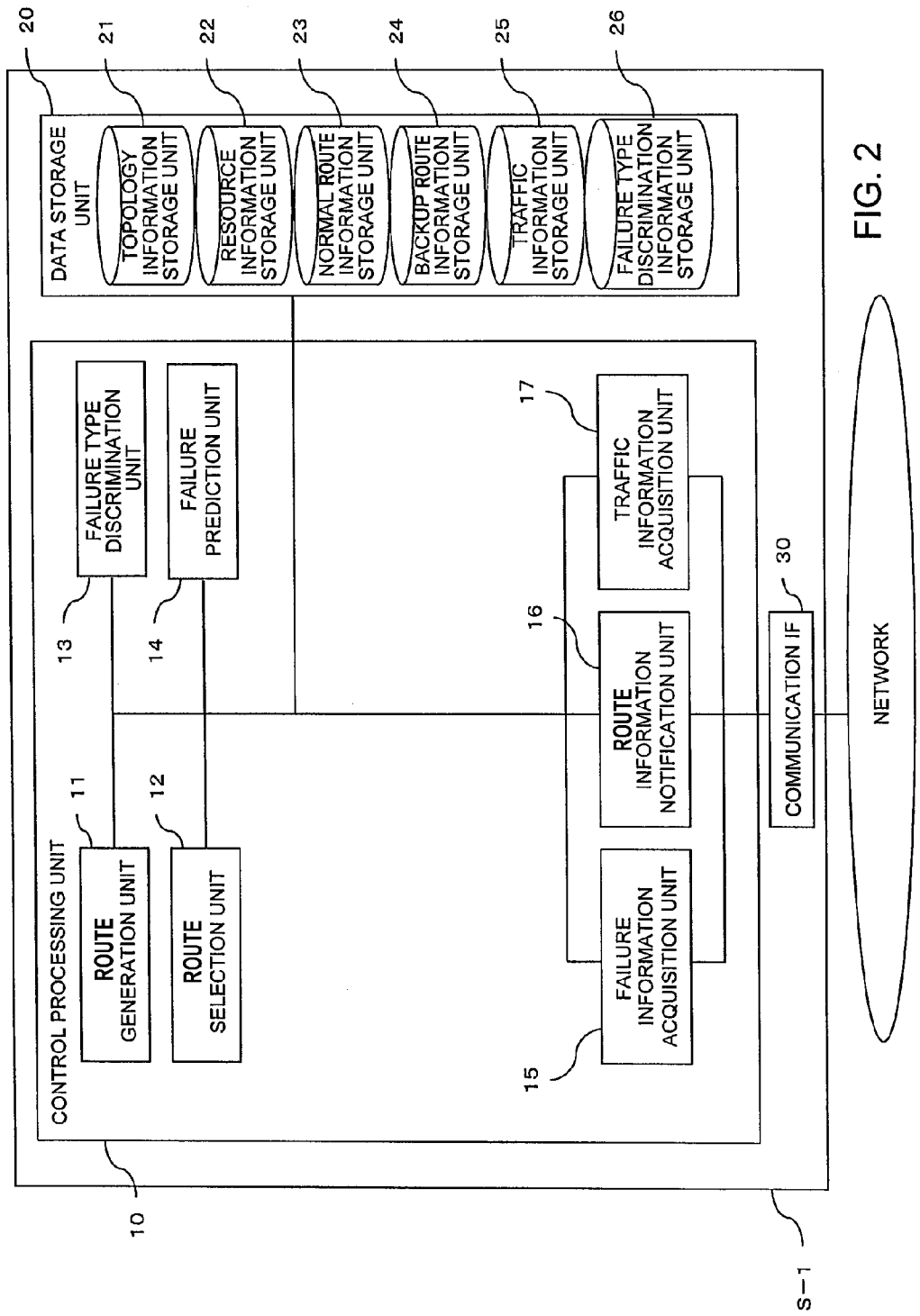
FIG. 2 is a configuration diagram of a transport control server.

FIG. 2 is a configuration diagram of the transport control server.

The transport control server S-1 includes a control processing unit 10, a data storage unit 20 and a communication IF 30, for example. The control processing unit 10 has a route generation unit 11, a route selection unit 12, a failure type discrimination unit 13, a failure prediction unit 14, a failure information acquisition unit 15, a routing information notification unit 16, and a traffic information acquisition unit 17, for example. The data storage unit 20 has a topology information storage unit 21, a resource information storage unit 22, a normal routing information storage unit 23, a backup routing information storage unit 24, a traffic information storage unit 22, and a failure type discrimination information storage unit 26, for example. Also, the transport control server S-1 may further have an input unit.

The route generation unit 11 generates the normal routing information in accordance with the topology information of a network to be established and resource information. Also, the route generation unit 11 generates in advance the backup routing information to be used upon occurrence of a failure, based on the prediction topology information and the prediction resource information which have been modified in accordance with a predicted failure position, for example. The route generation unit 11 stores the generated normal routing information and backup routing information in the normal routing information storage unit 23 and the backup routing information storage unit 24 of the data storage unit 20. The routing information notification unit 16 notifies the generated normal routing information to the node N.

The failure information acquisition unit 15 detects the occurrence of a failure. For example, it can detect the occurrence of failure by receiving the failure notification from the node N. If the failure information acquisition unit 15 detects the occurrence of the failure, the routing information notification unit 16 notifies the backup routing information stored in the data storage unit 20 to the node N.

The transport control server S-1 may create a plurality of backup routes, and select the backup route depending on the failure. For example, the route generation unit 11 generates the backup routing information for each of a plurality of predicted failure positions. The route generation unit 11 stores the generated backup routing information in the data storage unit 20, corresponding to the failure type indicating the predicted failure position. For example, the failure type discrimination unit 13 discriminates the failure type corresponding to the failure position of occurrence, if the failure information acquisition unit 15 detects the occurrence of a failure. The route selection unit 12 selects the corresponding backup routing information in accordance with the discriminated failure type. The routing information notification unit 16 notifies the backup routing information selected from among a plurality of pieces of backup routing information stored in the data storage unit 20 to the node N.

Also, the transport control server S-1 may notify the backup routing information to only the relevant node N. For example, the data storage unit 20 further stores the relevant node information indicating the node N to modify the routing information due to failure, corresponding to the failure type. The route selection unit 12 specifies the relevant node information corresponding to the discriminated failure type. The routing information notification unit 16 notifies the selected backup routing information to the node N conforming to the specified relevant node information.

The failure type discrimination unit 13 discriminates the failure type corresponding to the failure position detected by the failure information acquisition unit 15 by referring to the failure type discrimination information storage unit 26 where the failure position and the failure type are pre-stored associated.

The failure prediction unit 14 specifies one or more failure positions to be predicted. Also, the prediction topology information is obtained by modifying the topology information in accordance with the predicted failure position. There are following methods for predicting the failure (calculating a failure occurrence probability) in the failure prediction unit 14. The predicted failure position may be specified by any other method than the following methods.

(1) Prediction with Apparatus Specifications

A failure occurrence probability is given in advance as the set value to the transport control server S-1 in accordance with the apparatus specifications, etc. For example, the failure prediction unit 14 specifies the node N and link where the failure occurrence probability is greater than a predetermined threshold as the predicted failure position, in which the failure occurrence probability is preset for each node N and each link between the nodes N.

(2) Prediction with Failure History

A failure occurrence probability is specified according to the occurrence number of failures with a history of failure events in the past for each node N and each link between the nodes N. For example, the data storage unit 20 further stores the failure history information including the history of failure events in the past for each node N and each link between the nodes N. The failure prediction unit 14 specifies the node N and the link between the nodes N in which the occurrence number of failures is greater than a predetermined threshold as the predicted failure position, based on the failure history information.

(3) Prediction with Traffic History

A failure occurrence probability is specified according to the number that the traffic exceeds a permissible band of link, with a history of traffic information in the past for each link between the nodes N. For example, the traffic information acquisition unit 17 acquires the traffic information for each node N and each link between the nodes N at a predetermined timing. The data storage unit 20 stores the traffic history information including the history of acquired traffic information. The failure prediction unit 14 obtains the number that the traffic exceeds the predetermined permissible band of link, based on the traffic history information, and specifies the node N or the link between the nodes N in which the obtained number is greater than a predetermined threshold as the predicted failure position.

FIGS. 6 and 7 are explanatory views of the backup routing information storage unit 24.

In the illustrated examples, the backup routing information storage unit 24 has a backup routing information ID table 24-1 and a plurality of backup routing information tables 24-2 via a backup routing information ID. The backup routing information can be stored in the backup routing information storage unit 24, using these tables, for example. The backup routing information storage unit 24 may be composed of one table without interposing the backup routing information ID.

FIG. 6 is an explanatory view of the backup routing information ID table 24-1.

The backup routing information ID table 24-1 stores the relevant node information 24-12 and the backup routing information ID 24-13, corresponding to the failure type 24-11, for example. The backup routing information ID table 24-1 can store a plurality of pieces of relevant node information 24-12, corresponding to one failure type 24-11, and store the backup routing information ID 24-13, corresponding to each relevant node information 24-12, for example. The failure type 24-11 may be the sequential number, characters, or appropriate identification information, for example. The relevant node information 24-12 stores a node identifier, for example. The node identifier may be an appropriate symbol or character for specifying the node N, for example. The backup routing information ID may be the sequential number, characters, or appropriate identification information such as an address indicating an area where the backup routing information is stored, for example.

FIG. 7 is an explanatory view of the backup routing information table 24-2.

The backup routing information table 24-2 stores the backup routing information ID 24-21 and the backup routing information, for example. Herein, the backup routing information includes a destination node 24-24 of the backup route, corresponding to an entry 24-22, for example. The entry 24-22 indicates the address of a terminal (destination) to which data is finally send, for example. The destination node 24-24 of the backup route indicates the node identifier of the next hop in the backup route, for example. Though the backup routing information ID "001" is indicated in FIG. 7, the backup routing information storage unit 24 has the backup routing information table 24-2 corresponding to each backup routing information ID. In this illustrated example, the backup routing information table 24-2 includes a destination node 24-23 of the normal route, which may be omitted. The destination node 24-23 of the normal route indicates the node identifier of the next hop in the normal route.

FIG. 8 is an explanatory view of the failure type discrimination information storage unit 26.

The failure type discrimination information storage unit 26 stores a failure position 26-2, corresponding to a failure type 26-1, for example. The failure position 26-2 stores the node identifier of the node N for which the occurrence of failure is predicted, for example. In this embodiment, the failure type 26-1 and the failure position 26-2 are referred to as the failure type discrimination information, for example.

FIG. 9 is an explanatory view of topology information. The topology information is a connection state between the nodes N, and an LSDB for use in an OSPF as an example. In FIG. 9, the node identifier of a sender (FROM), the node identifier of a destination (TO) and the link identifier connecting them are shown. Also, in an illustrated example, N-1 to N-5 designate the node identifiers and L12 to L54 designate the link identifiers. The link identifier may be the appropriate symbol or character specifying each link between the nodes N, for example. The connection relationship of FIG. 9 is stored in the topology information storage unit 21.

FIG. 10 is an explanatory view of the resource information storage unit 22.

The resource information storage unit 22 stores the resource information such as the band information 22-2 and a buffer capacity 22-3, corresponding to the link identifier or node identifier 22-1, for example. The band information 22-2 indicates a link band, for example. The buffer capacity 22-3 indicates the buffer capacity of a node interface, for example.

Each information stored in the data storage unit 20 may be stored in any appropriate form other than the table organization as described above.

Figure 3:
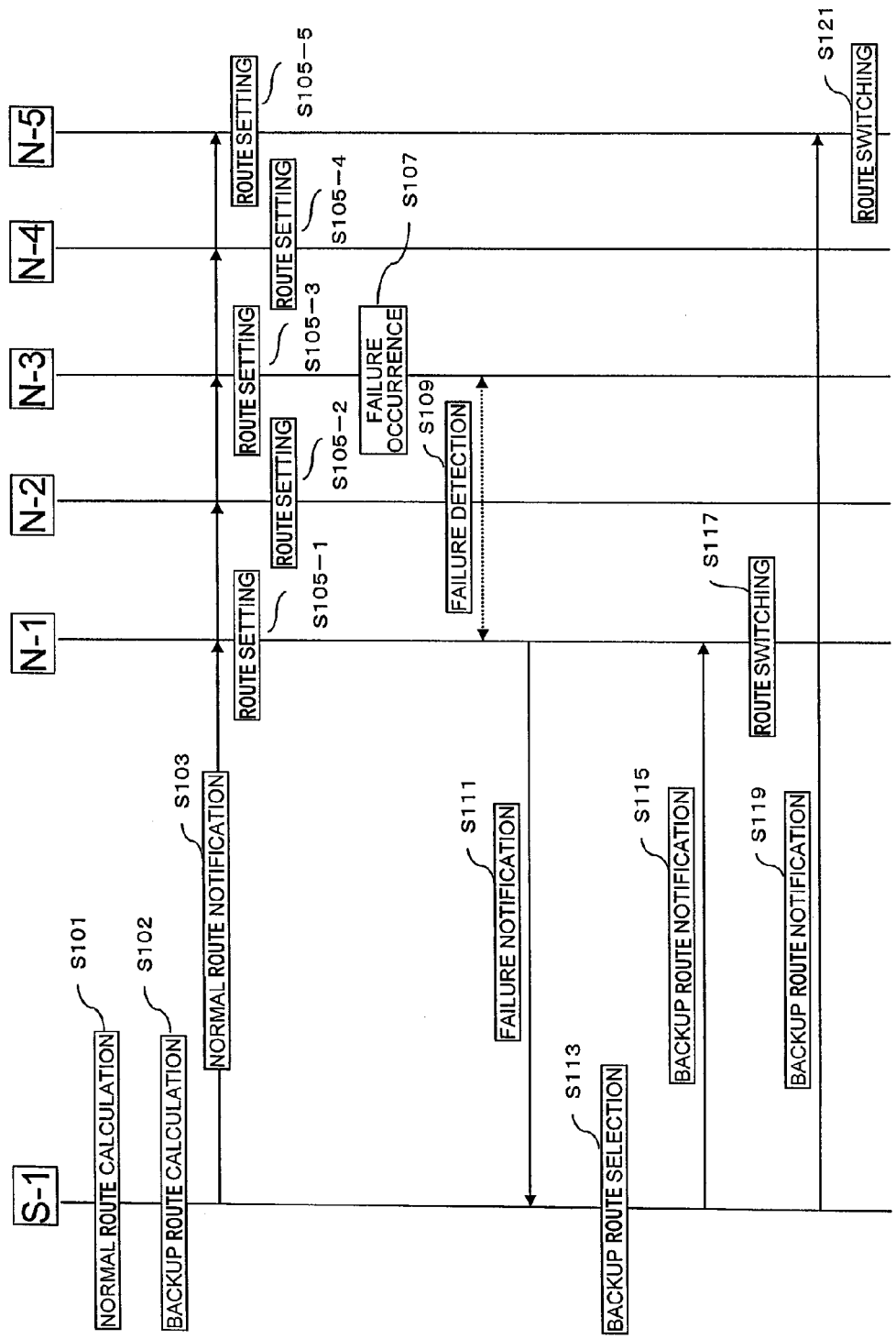
FIG. 3 is a sequence chart before and after the occurrence of a failure.

FIG. 3 is a sequence chart before and after the occurrence of a failure.

Referring to FIG. 3, the operation before and after the occurrence of a failure will be described below. The operation of the transport control server S-1 will be described later in detail.

The transport control server S-1 calculates the normal route (S101). Subsequently, the transport control server S-1 calculates the backup route (S102). The transport control server S-1 sends the normal routing information created at step S101 to each node N (S103). Each node N receives the normal routing information (S103), and sets up the received normal routing information (S105-1 to S105-5). Each node N performs the normal operation in accordance with the set normal routing information.

Thereafter, if a failure occurs at the node N-3 (S107), the adjacent node N-1 detects the failure (S109). The node N-1 detecting the failure sends a failure notification to the transport control server S-1 (S111). The detection of failure and the sending of the failure notification may be made at the node N-5. The transport control server S-1 receives the failure notification (S111), and selects the backup route (S113). The transport control server S-1 notifies the backup routing information selected at step S113 to the node N-1 relating to the failure of the node N-3 (S115). The node N-1 receives the backup routing information (S115), and switches the routes in accordance with the received backup routing information (S117). Similarly, the transport control server S-1 notifies the backup routing information selected at step S113 to the other node N-5 relating to the failure of the node N-3 (S119). The node N-5 receives the backup routing information (S119), and switches the routes in accordance with the received backup routing information (S121).

Figure 4:
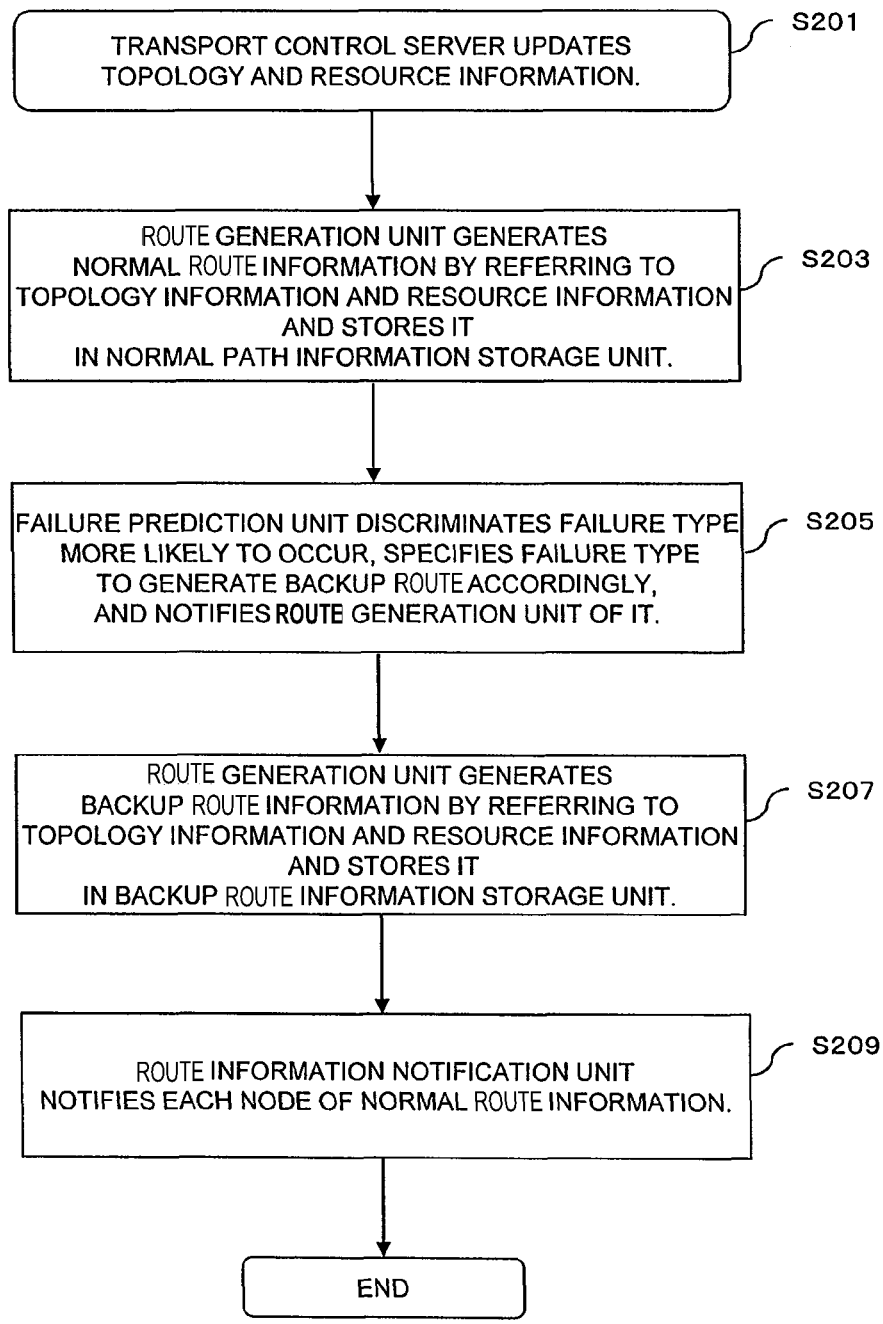
FIG. 4 is a flowchart of a generation process for normal routing information and backup routing information.

FIG. 4 is a flowchart of a generation process for normal routing information and backup routing information.

The process of FIG. 4 corresponds to the steps S101 to S103 of FIG. 3, for example. First of all, the transport control server S-1 updates the topology information and the resource information (S201). For example, a network administrator operates the appropriate input unit to enable the transport control server S-1 to input each of the topology information and the resource information from the input unit and update the topology information of the topology information storage unit 21 and the resource information of the resource information storage unit 22. The topology information and the resource information may be pre-stored in the topology information storage unit 21 and the resource information storage unit 22, respectively.

The route generation unit 11 generates the normal routing information by referring to the topology information of the topology information storage unit 21 and the resource information of the resource information storage unit 22, and stores it in the normal routing information storage unit 23 (S203). A route calculation method may be an appropriate method as conventionally used.

The failure prediction unit 14 discriminates the failure type more likely to occur, specifies the failure type to generate the backup route accordingly, and notifies the route generation unit 11 of the specified failure type (S205). Also, the route generation unit 11 generates the backup routing information by referring to the topology information of the topology information storage unit 21 and the resource information of the resource information storage unit 22, and stores it in the backup routing information storage unit 24 (S207).

A specific processing example at the steps S205 and S207 will be described below.

First of all, the traffic information acquisition unit 17 acquires the traffic information of the node N or the link between the nodes N at an appropriate timing from the network, and pre-stores it in the traffic information storage unit 25.

The failure prediction unit 14 specifies the failure position predicted from the traffic history of the traffic information storage unit 25 in accordance with the above prediction method with the traffic history, for example. The failure prediction unit 14 stores the specified predicted failure position in the failure type discrimination information storage unit 26. The failure prediction unit 14 assigns the corresponding failure type to the failure position 26-2, and stores it in the failure type discrimination information storage unit 26, corresponding to the failure position 26-2. Also, the failure prediction unit 14 creates the prediction topology information corresponding to the failure type 26-1, and the prediction resource information, for example. As one example, the failure prediction unit 14 deletes the node N or the link between the nodes N at the failure position from the topology information, based on the topology information used in generating the normal route at step S203, and the failure position 26-2 of the failure type discrimination information, and creates the prediction topology information. For example, in a case in which the failure type is 001 as shown in FIG. 8, the failure prediction unit 14 deletes the node N-3 and the link connecting to the node N-3 from the topology information used in generating the normal route at step S203, and creates the prediction topology information. For the prediction resource information, the resource information may be properly updated, or the resource information used in generating the normal route at step S203 may be used. The failure prediction unit 14 stores the created prediction topology information and prediction resource information in the topology information storage unit 21 and the resource information storage unit 22, respectively. The topology information and the resource information (current network information) in creating the normal route and the prediction topology information and the prediction resource information for creating the backup route can be stored separately without overwriting. Also, the prediction topology information and the prediction resource information may be created by the failure prediction unit 14, or the route generation unit 11. Or a topology information update unit and a resource information update unit may be provided.

The route generation unit 11 stores the assigned failure type in the backup routing information ID table 24-1. Also, the route generation unit 11 specifies the relevant node corresponding to each failure type 24-11 from the failure position 26-2 and the topology information, for example. For example, in the case in which the failure type is 001 as shown in FIG. 8, the route generation unit 11 retrieves the node N-3 as the failure position by referring to the topology information and specifies the node N connected to the node N-3 as the relevant node. In this case, the nodes N-1 and N-5 are specified as the relevant nodes. Besides, the nodes N-1 and N-5 connected to the node N-3 may detect the occurrence of failure at the node N-3, and send the failure notification to the transport control server S-1, whereby the route generation unit 11 may specify the nodes N-1 and N-5 of the senders of the failure notification as the relevant nodes. The route generation unit 11 stores the identification information (relevant node information) of the specified relevant node in the backup routing information ID table 24-1, corresponding to the failure type 24-11. The route generation unit 11 assigns the backup routing information ID 24-13 for the relevant node information 24-12, and stores it in the backup routing information ID table 24-1.

The route generation unit 11 creates the backup routing information for each relevant node information 24-12, based on the prediction topology information and the prediction resource information. A method for calculating the routing information may be an appropriate method as conventionally used. Also, it is necessary herein that the backup routing information for at least the relevant node is obtained, but it may be obtained for all the nodes.

Also, the route generation unit 11 stores the assigned backup routing information ID in the backup routing information ID table 24-2. The route generation unit 11 stores the backup routing information in the backup routing information storage unit 24 for all the relevant node information 24-12.

Returning to FIG. 4, at step S209, the routing information notification unit 16 notifies each node N of the normal routing information (S209). For example, the routing information notification unit 16 reads the normal routing information from the normal routing information storage unit 23, and sends it to each node N via the communication IF 30. The processing at step S209 may be made at an appropriate timing after step S203.

Though the explanation of this flowchart is involved in an instance of predicting the failure based on the traffic information, the failure prediction may be made by the above-described method of the prediction with the apparatus specifications or prediction with failure history, or other appropriate methods.

Figure 5:
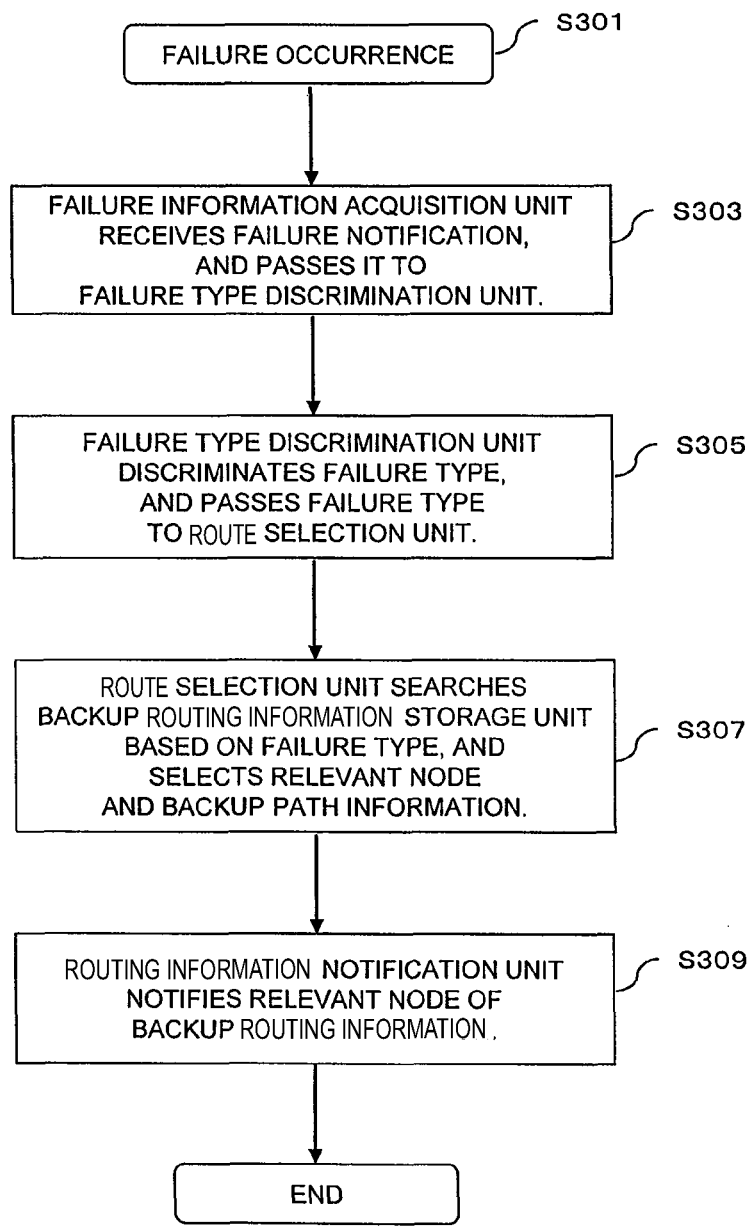
FIG. 5 is a flowchart of a backup route selection process upon occurrence of failure.
Figure 11:
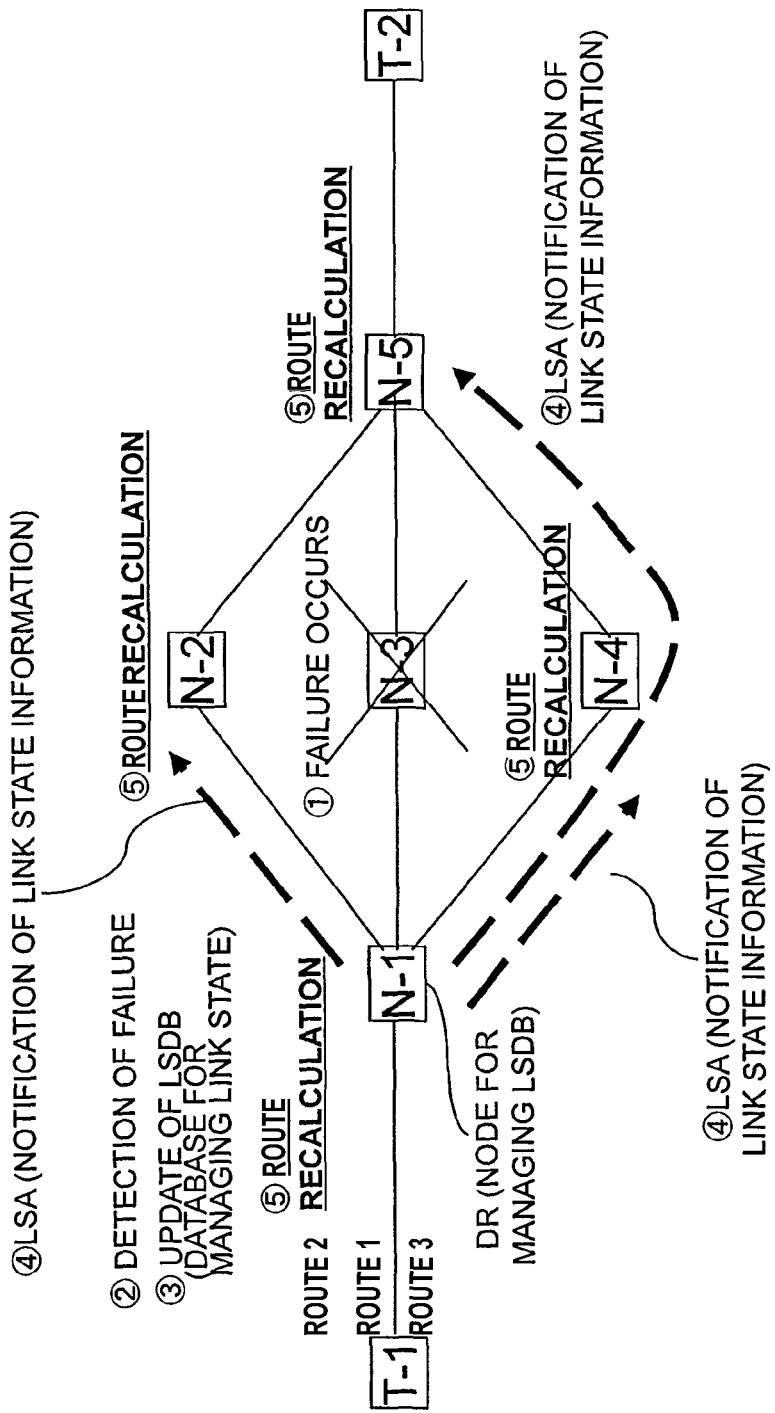
FIG. 11 is an explanatory view of the conventional art.

FIG. 5 is a flowchart of a backup route selection process upon occurrence of failure.

This process of FIG. 5 corresponds to the steps S107 to S119 of FIG. 3.

If a failure occurs at the node N or the link between the nodes N (S301), the failure information acquisition unit 15 receives a failure notification, and passes the information of failure position included in the received failure notification to the failure type discrimination unit 13 (S303). For example, the failure information acquisition unit 15 receives the failure notification including the information of failure position from the node N detecting the failure. The information of failure position may be the node identifier of the node or the link identifier of the link, where the failure occurs, for example. A method for detecting the failure at each node may be an appropriate method of sending or receiving a health check packet, for example.

The failure type discrimination unit 13 discriminates the failure type, and passes the failure type to the route selection unit 12 (S305). For example, the failure type discrimination unit 13 discriminates the failure type by referring to the failure position 26-2 of the failure type discrimination information storage unit 26, based on the failure position received from the failure information acquisition unit 15. If the failure position received from the failure information acquisition unit 15 exists in the failure type discrimination information storage unit 26, the failure type discrimination unit 13 acquires the failure type 26-1 corresponding to the applicable failure position 26-2.

The route selection unit 11 searches the backup routing information storage unit 24, based on the failure type, and selects the relevant node and the backup route (S307). For example, the route selection unit 11 retrieves the failure type received from the failure type discrimination unit 13 by referring to the failure type 24-11 of the backup routing information ID table 24-1. If the failure type received from the failure type discrimination unit 13 exists in the backup routing information ID table 24-1, the route selection unit 11 specifies the relevant node information 24-12 corresponding to the applicable failure type 24-11 and the backup routing information ID 24-13. The route selection unit 11 sends the specified relevant node information and backup routing information ID to the routing information notification unit 16.

The routing information notification unit 16 notifies the relevant node N of the backup routing information (S309). For example, the routing information notification unit 16 reads the backup routing information corresponding to the backup routing information ID from the backup routing information storage unit 24, based on the backup routing information ID received from the route selection unit 11. The routing information notification unit 16 sends the read backup routing information via the communication IF 30 to the relevant node N in accordance with the specified relevant node information.

For example, before the occurrence of failure at step S209, the routing information notification unit 16 may notify in advance the backup routing information ID and the backup routing information to the node N, and after the occurrence of failure, the routing information notification unit 16 may notify the backup routing information ID to the relevant node N, and the relevant node N may read the backup routing information corresponding to the notified backup routing information ID, at step S309, for example.

In this embodiment, the transport control server can calculate in advance the backup route to shorten the time required for route recalculation and route switching upon occurrence of failure. Also, in this embodiment, when the failure occurs, it is possible to prevent the route recalculation and route switching at each node, and reduce a processing load of each node. Further, in this embodiment, the transport control server sends the backup routing information and a switching command to only the node relating to the failure, whereby it is possible to reduce the load of the node not relating to the failure.

In this embodiment, it is possible to deal with the failure without having the redundant constitution within the apparatus. Also, in this embodiment, it is possible to deal with the failure that occurs in the connection between the nodes.

INDUSTRIAL APPLICABILITY

The invention is applicable to a network system that recalculates the routing information when the failure occurs, and then switches over to the new route.

DESCRIPTION OF THE REFERENTIAL MARKS

T-1, T-2 terminal
N-1, N-2, N-3, N-4, N-5 node
S-1 transport control server
10 control processing unit
11 route generation unit
12 route selection unit
13 failure type discrimination unit
14 failure prediction unit
15 failure information acquisition unit
16 routing information notification unit
17 traffic information acquisition unit
20 data storage unit
21 topology information storage unit
22 resource information storage unit
23 normal routing information storage unit
24 backup routing information storage unit
25 traffic information storage unit
26 failure type discrimination information storage unit
30 communication if

The invention claimed is:

1. A transport control server connected with a network system comprising a plurality of nodes transferring data in accordance with routing information and communication lines connecting the plurality of nodes, the transport control server comprising:
a route generation unit for generating normal routing information based on topology information of the network which is set and generating alternative routing information, for a possible route failure, based on alternative topology information in which a possible route failure type including a failure of any node or communication line has been considered;
a routing information notification unit for notifying the nodes of the generated normal routing information;
a data storage unit for storing the generated alternative routing information; and
a failure information acquisition unit for acquiring route failure information from any of the nodes which have detected the route failure,
wherein if the failure information acquisition unit acquires the route failure information, the routing information notification unit notifies one or more nodes of the alternative routing information selected based on the route failure type, and
the routing information of the alternative routing information is modified by the selection, wherein
the route generation unit:
generates the alternative routing information for each possible route failure type, and
stores the generated alternative routing information in the data storage unit, wherein
the transport control server further comprises:
a failure type discrimination unit for discriminating the route failure type corresponding to a position of a detected route failure, if the failure information acquisition unit acquires the route failure information; and
a route selection unit for selecting corresponding alternative routing information in accordance with the discriminated route failure type.

2. The transport control server according to claim claim 1, wherein
the data storage unit further stores relevant node information indicating one or more of the nodes to modify the routing information due to the route failure, the relevant node information corresponds to the route failure type,
the route selection unit specifies corresponding relevant node information in accordance with the discriminated route failure type, and
the routing information notification unit selects the one or more nodes to be notified of the alternative routing information, the routing information of the alternative routing information is modified by the selection in accordance with the specified relevant node information.

3. The transport control server according to claim claim 1, wherein
the failure type discrimination unit discriminates the route failure type corresponding to route failure position acquired by the failure information acquisition unit, by referring to failure type discrimination information in which the route failure position and the route failure type are associated in advance.

4. The transport control server according to claim claim 1, further comprising;
a failure prediction unit for specifying a plurality of possible route failure positions.

5. A transport control server connected with a network system comprising a plurality of nodes transferring data in accordance with routing information and communication lines connecting the plurality of nodes, the transport control server comprising:
a route generation unit for generating normal routing information based on topology information of the network which is set and generating alternative routing information, for a possible route failure, based on alternative topology information in which a possible route failure type including a failure of any node or communication line has been considered;
a routing information notification unit for notifying the nodes of the generated normal routing information;
a data storage unit for storing the generated alternative routing information; and
a failure information acquisition unit for acquiring route failure information from any of the nodes which have detected the route failure,
wherein if the failure information acquisition unit acquires the route failure information, the routing information notification unit notifies one or more nodes of the alternative routing information selected based on the route failure type, and
the routing information of the alternative routing information is modified by the selection, wherein
the route generation unit:
generates the alternative routing information for each possible route failure type, and
stores the generated alternative routing information in the data storage unit, wherein
the transport control server, further comprises;
a failure prediction unit for specifying a plurality of possible route failure positions,
wherein the failure prediction unit:
refers to a failure occurrence probability preset for each node and each communication line between the nodes to specify one or more of the nodes and the communication lines where a failure occurrence probability is greater than a predetermined threshold as the possible route failure position.

6. A transport control server connected with a network system comprising a plurality of nodes transferring data in accordance with routing information and communication lines connecting the plurality of nodes, the transport control server comprising:
- a route generation unit for generating normal routing information based on topology information of the network which is set and generating alternative routing information, for a possible route failure, based on alternative topology information in which a possible route failure type including a failure of any node or communication line has been considered;
- a routing information notification unit for notifying the nodes of the generated normal routing information;
- a data storage unit for storing the generated alternative routing information; and
- a failure information acquisition unit for acquiring route failure information from any of the nodes which have detected the route failure,
- wherein if the failure information acquisition unit acquires the route failure information, the routing information notification unit notifies one or more nodes of the alternative routing information selected based on the route failure type, and
- the routing information of the alternative routing information is modified by the selection, wherein
- the route generation unit:
- generates the alternative routing information for each possible route failure type, and
- stores the generated alternative routing information in the data storage unit, wherein
- the transport control server, further comprises;
- a failure prediction unit for specifying a plurality of possible route failure positions, wherein
- the data storage unit further stores failure history information including a history of failure events in the past for each node and each communication line between the nodes, and
- the failure prediction unit specifies one or more of the nodes and the communication lines in which the occurrence number of failures is greater than a predetermined threshold as the possible route failure position, based on the failure history information.

7. A transport control server connected with a network system comprising a plurality of nodes transferring data in accordance with routing information and communication lines connecting the plurality of nodes, the transport control server comprising:
- a route generation unit for generating normal routing information based on topology information of the network which is set and generating alternative routing information, for a possible route failure, based on alternative topology information in which a possible route failure type including a failure of any node or communication line has been considered;
- a routing information notification unit for notifying the nodes of the generated normal routing information;
- a data storage unit for storing the generated alternative routing information; and
- a failure information acquisition unit for acquiring route failure information from any of the nodes which have detected the route failure,
- wherein if the failure information acquisition unit acquires the route failure information, the routing information notification unit notifies one or more nodes of the alternative routing information selected based on the route failure type, and
- the routing information of the alternative routing information is modified by the selection, wherein
- the route generation unit:
- generates the alternative routing information for each possible route failure type, and
- stores the generated alternative routing information in the data storage unit, wherein
- the transport control server, further comprises;
- a failure prediction unit for specifying a plurality of possible route failure positions; and
- a traffic information acquisition unit for acquiring traffic information on each node and each communication line between the nodes,
- wherein the data storage unit further stores traffic history information including the history of acquired traffic information, and
- the failure prediction unit obtains the number of times or time that the traffic exceeds a predetermined permissible band, based on the traffic history information, and specifies one or more of the nodes or the communication line in which the number of times or the time is greater than the predetermined threshold as the possible route failure position.

8. A network system comprising:
- a transport control server; and
- a plurality of nodes transferring data in accordance with routing information and communication lines connecting the plurality of nodes;
- wherein the transport control server comprises:
- a route generation unit for generating normal routing information based on topology information of a network which is set and generating alternative routing information for a possible route failure based on alternative topology information in which a possible route failure type including a failure of any node or communication line has been considered;
- a routing information notification unit for notifying the nodes of the generated normal routing information;
- a data storage unit for storing the generated alternative routing information; and
- a failure information acquisition unit for acquiring route failure information from any of the nodes which have detected the route failure,
- wherein if the failure information acquisition unit acquires the route failure information, the routing information notification unit notifies one or more nodes of the alternative routing information selected based on the route failure type,
- the routing information of the alternative routing information is modified by the selection, and
- the nodes receive the alternative routing information from the transport control server and change the normal routing information into the alternative routing information,
- wherein the route generation unit:
- generates the alternative routing information for each possible route failure type, and
- stores the generated alternative routing information in the data storage unit, wherein
- the transport control server further comprises:
- a failure type discrimination unit for discriminating the route failure type corresponding to a position of a detected route failure, if the failure information acquisition unit acquires the route failure information; and
- a route selection unit for selecting corresponding alternative routing information in accordance with the discriminated route failure type.

9. A transport control method in a network system comprising a plurality of nodes and the transport control server, each node transferring data in accordance with routing information and communication lines connecting the plurality of nodes, the transport control method comprising the steps of:
   generating normal routing information based on topology information of a network which is set;
   generating alternative routing information for a possible route failure based on alternative topology information, in which a possible route failure type including a route failure of any node or communication line has been considered;
   notifying the nodes of the generated normal path information;
   storing the generated alternative routing information;
   acquiring route failure information from any of the nodes which have detected the route failure;
   notifying one or more nodes of the alternative routing information selected based on the route failure type, when the route failure information is acquired; and
   modifying the routing information of the alternative routing information in accordance with the selection,
   wherein alternative route information is generated for each possible route failure type, and the generated alternative routing information is stored, wherein
   the transport control method further comprises the steps of:
   discriminating the route failure type corresponding to a position of a detected route failure, if the route failure information is acquired; and
   selecting corresponding alternative routing information in accordance with the discriminated route failure type.

* * * * *